United States Patent
Malhotra et al.

(10) Patent No.: US 7,110,374 B2
(45) Date of Patent: Sep. 19, 2006

(54) WIRELESS LAN WITH DYNAMIC CHANNEL SELECTION

(75) Inventors: Richa Malhotra, Enschede (NL); Patrick Busch, Enschede (NL)

(73) Assignee: Lucent Technologies Inc., Murray Hill, NJ (US)

( * ) Notice: Subject to any disclaimer, the term of this patent is extended or adjusted under 35 U.S.C. 154(b) by 950 days.

(21) Appl. No.: 10/123,387

(22) Filed: Apr. 16, 2002

(65) Prior Publication Data

US 2002/0181417 A1 Dec. 5, 2002

(30) Foreign Application Priority Data

May 8, 2001 (EP) ................... 01304113

(51) Int. Cl.
*H04Q 7/00* (2006.01)
(52) U.S. Cl. .................................... 370/329
(58) Field of Classification Search ........ 370/276–278, 370/293, 310, 328, 329, 331, 332, 335, 338; 455/403, 421–423, 435–439
See application file for complete search history.

(56) References Cited

U.S. PATENT DOCUMENTS

| | | | |
|---|---|---|---|
| 5,280,630 A * | 1/1994 | Wang ..................... 455/452.2 |
| 5,418,839 A * | 5/1995 | Knuth et al. ................ 455/464 |
| 5,857,143 A * | 1/1999 | Kataoka ...................... 455/62 |
| 5,933,420 A | 8/1999 | Jaszewski et al. |
| 6,067,291 A * | 5/2000 | Kamerman et al. ......... 370/338 |
| 6,246,881 B1 * | 6/2001 | Parantainen et al. ........ 455/450 |
| 6,272,353 B1 * | 8/2001 | Dicker et al. ............... 455/517 |
| 6,292,475 B1 * | 9/2001 | Swail ......................... 370/329 |
| 6,480,721 B1 * | 11/2002 | Sydon et al. ............... 455/464 |
| 6,834,045 B1 * | 12/2004 | Lappetelainen et al. .... 370/329 |
| 6,922,405 B1 * | 7/2005 | Eikelenboom et al. ...... 370/338 |

FOREIGN PATENT DOCUMENTS

EP    0 903 891    3/1999

OTHER PUBLICATIONS

XP-000960856 Medium Access Control of Wireless LANs for Mobile Computing by Kwang-Cheng Chen, IEEE, 1994.
XP-000656012 Real Time Traffic Over the IEEE 802.11 Medium Access Control Layer by J. Sobrinho, Bells Labs Technical Journal, 1996.

* cited by examiner

*Primary Examiner*—Dmitry Levitan

(57) ABSTRACT

The present invention describes an algorithm for the assignment of channels used by access points (APs) in wireless LANs in a dynamic way in order to achieve the best performance. The assignment of channels is based on a procedure in which an AP is passively listening on the other channels during idle time. The AP is calculating the optimal channel with the least interference and sharing. If the AP experiences too much disturbance, it will decide to switch to the calculated optimal channel.

23 Claims, 7 Drawing Sheets

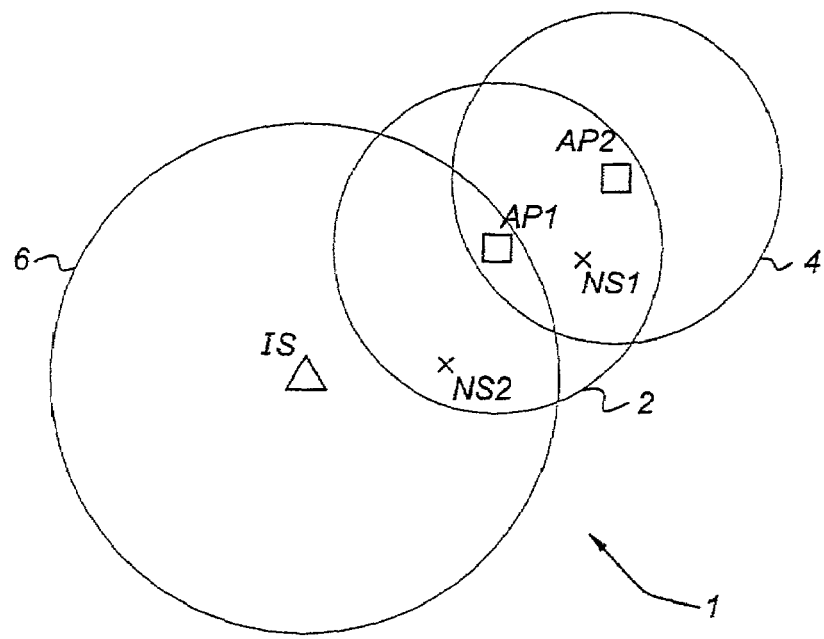
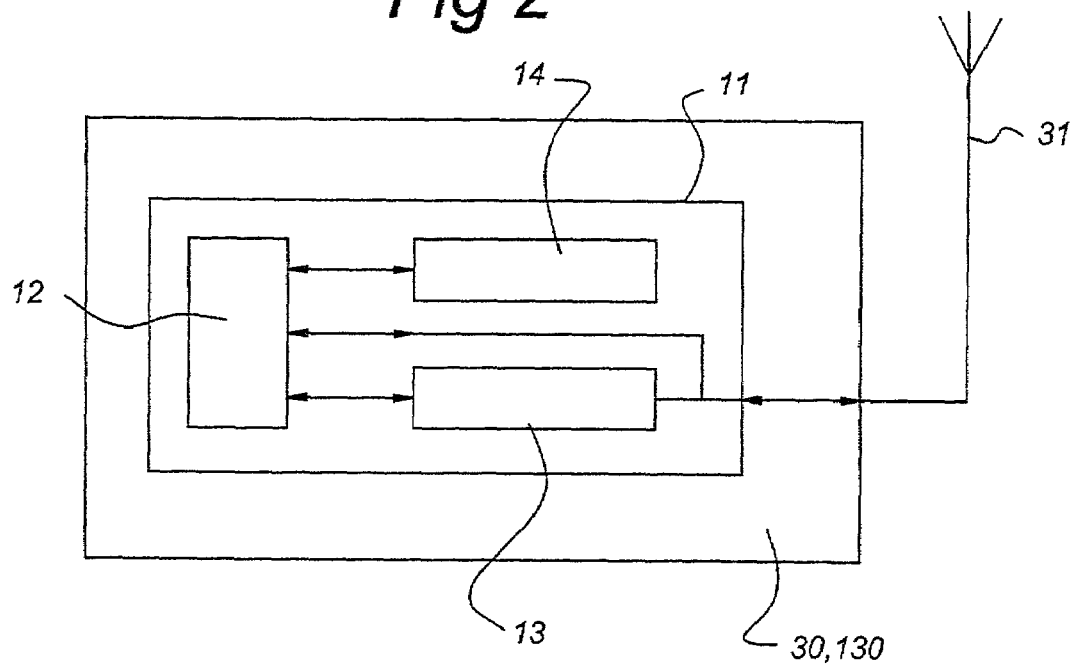

WIRELESS LAN WITH DYNAMIC CHANNEL SELECTION

CROSS REFERENCE TO RELATED APPLICATION

This application claims priority of European Application No. 01304113.2 filed on May 8, 2001.

FIELD OF THE INVENTION

The present invention relates to a communication system comprising a plurality of access points (APs) and network stations, each said network station being arranged to communicate with one of said access points through a wireless communication protocol.

BACKGROUND OF THE INVENTION

Wireless local area networks (LANs) have been developed as an enhanced replacement for wired LANs. In a wireless LAN for data-communication a plurality of (mobile) network stations (e.g., personal computers, telecommunication devices, etc.) are present that are capable of wireless communication. As compared to wired LANs, data-communication in a wireless LAN can be more versatile, due to the flexibility of the arrangement of network stations in the area covered by the LAN, and due to the absence of cabling connections.

Wireless LANs are generally implemented according to the standard as defined by the ISO/IEC 8802–11 international standard (IEEE 802.11). IEEE 802.11 describes a standard for wireless LAN systems that will operate in the 2.4–2.5 GHz ISM (industrial, scientific and medical) band. This ISM band is available worldwide and allows unlicensed operation for spread spectrum systems. For both the US and Europe, the 2,400–2,483.5 MHz band has been allocated, while for some other countries, such as Japan, another part of the 2.4–2.5 GHz ISM band has been assigned. The IEEE 802.11 standard focuses on the MAC (medium access control) and PHY (physical layer) protocols for AP based networks and ad-hoc networks.

In AP based wireless networks, the stations within a group or cell can communicate only directly to the AP. This AP forwards messages to the destination station within the same cell or through the wired distribution system to another AP, from which such messages arrive finally at the destination station. In ad-hoc networks, the stations operate on a peer-to-peer level and there is no AP or (wired) distribution system.

The 802.11 standard supports three PHY protocols: DSSS (direct sequence spread spectrum), FHSS (frequency hopping spread spectrum), and infrared with PPM (pulse position modulation). All these three PHYs provide bit rates of 1 and 2 Mbit/s. Furthermore, IEEE 802.11 includes extensions 11a and 11b which allow for additional higher bit rates: Extension 11b provides bit rates 5.5 and 11 Mbit/s as well as the basic DSSS bit rates of 1 and 2 Mbit/s within the same 2.4–2.5 GHz ISM band. Extension 11a provides a high bit rate OFDM (Orthogonal Frequency Division Multiplexing modulation) PHY standard providing bit rates in the range of 6 to 54 Mbit/s in the 5 GHz band.

The IEEE 802.11 basic MAC protocol allows interoperability between compatible PHYs through the use of the CSMA/CA (carrier sense multiple access with collision avoidance) protocol and a random back-off time following a busy medium condition. The IEEE 802.11 CSMA/CA protocol is designed to reduce the collision probability between multiple stations accessing the medium at the same time. Therefore, a defer and random back-off arrangement is used to resolve medium contention conflicts. The defer decision is based on a configuration entity called the defer threshold (R_defer). When a carrier signal level is observed above the R_defer level, a network station holds up a pending transmission request. If the observed level is below the R_defer, a network transmission is allowed to start communicating with its associated access point.

In addition, the IEEE 802.11 MAC protocol defines special functional behaviour for fragmentation of packets, medium reservation via RTS/CTS (request-to-send/clear-to-send) polling interaction and point co-ordination (for time-bounded services).

Moreover, the IEEE 802.11 MAC protocol defines Beacon frames sent at regular intervals by the AP to allow stations to monitor the presence of the AP.

The IEEE 802.11 standard defines two types of MAC mechanisms: PCF (point co-ordination function) which provides contention free frame transfer whereas DCF (distributed co-ordination function) provides contention based frame transfer. Both these MAC mechanisms can operate together. This is done by dividing the time between two beacons into a contention free part (PCF) and a contention part (DCF). The CFP (Contention Free Period) repetition interval is a fixed length which includes both the contention free period as well as contention period. See also FIG. 59 in the IEEE 802.11 standard.

The IEEE 802.11 MAC protocol also gives a set of management frames including Probe Request frames, which are sent by a station and are followed by Probe Response frames sent by an available AP. This protocol allows a station to actively scan for APs operating on other frequency channels and for the APs to show to the stations what parameter settings the APs are using. In 802.11 AP-based wireless LANs the network stations normally associate to an AP that is the best received and the nearest and has a corresponding network name.

Every DSSS AP operates on one channel. The number of channels depends on the regulatory domain in which the wireless LAN is used (e.g. 11 channels in the U.S. in the 2.4 GHz band). This number can be found in ISO/IEC 8802-11, ANSI/IEEE Std 802.11 Edition 1999-00-00. Overlapping cells using different channels can operate simultaneously without interference if the channel distance is at least 3. Non-overlapping cells can always use the same channels simultaneously without interference. Channel assignment can be dynamic or fixed. Dynamic channel assignment is preferable, as the environment itself is dynamic as well.

In [Kamerman, December 1999] dynamic assignment of channels is called dynamic frequency selection (DFS). The aim of the DFS algorithm is to dynamically assign channels in a wireless LAN in such a way that the best performance is achieved. Performance can be expressed in terms of throughput, delay and fairness. An AP with dynamic frequency selection is able to switch its channel in order to obtain a better operating channel. It will usually choose a channel with less interference and channel sharing than that on the current channel. An AP will scan on all channels to determine which channel frequencies are in use and what receive levels and load factors occur in neighbour cells. During a scan of a channel the AP sends a Probe Request frame to evoke a Probe Response from all APs tuned to the same channel and within radio range. The Probe Response packet carries information on load factor from each AP on the channel in question.

By scanning over all channels, an AP assembles a table with an entry for each channel. Each entry contains receive level, the load factor as reported in the Probe Response packet and the measured noise level. The receive level stored in the table is the level at which the Probe Response packet is received from another AP active operating on the channel in question. The said table is used in a DFS algorithm as described in [Kamerman, December 1999].

The strategy of the DFS algorithm described in [Kamerman, December 1999] expects responding APs to send load information in the Probe Responses, which is not standard (IEEE 802.11) compliant. So it is very likely that this load information will never be obtained from APs made by other manufacturers. Therefore it does not solve the problem of unlicensed spectrum. Secondly, waiting for the Probe Requests can take up to 50 ms if the other AP is very busy. This situation is highly undesirable especially if the AP sending the Probe Request is highly loaded. The load at the AP sending the Probe Request is not taken into account while periodic scanning. Thirdly, the strategy as described in [Kamerman, 1999] lacks a strategy about when to change channels. Changing channels is done periodically but this might not be necessary at all. Finally, in the DFS algorithm mentioned above, a fixed scan interval of 1 hour is used. This is a very long time and a lot of changes in circumstances can take place. A microwave oven could come on and go off within that time, causing a decrease in throughput of an AP. On the other hand, if the scanning interval is reduced to a very small value, the AP could be scanning for most of the time causing again a decrease in throughput. The problem lies in the fixed scan interval and the fact that all channels are scanned one after the other.

SUMMARY OF THE INVENTION

It is an object of the present invention to overcome the problems mentioned above by using a different algorithm that is based on APs passively listening on the different channels. The method of passively listening provides not just information about all possible sources of interference on a channel but also about the load on it.

The present invention relates to an access point for a wireless communication network, comprising a processor and memory storing data and instructions, arranged to dynamically select an optimum channel by carrying out the following steps:
(a) selecting a channel from a plurality of possible channels;
(b) collecting data as to at least level of Medium Activity on said channel during a predetermined scanning time;
(c) storing a channel interference parameter indicative of a time period in said scanning time that said level of Medium Activity exceeded a first threshold value;
(d) repeating steps (b) and (c) for all other channels of said plurality of channels;
(e) selecting said optimum channel in accordance with a predetermined rule taking said channel interference parameter into account.

Furthermore, the present invention relates to an access point as described above, wherein the following steps are carried out:
additionally storing, in step (c), a channel sharing parameter indicative of a time period in said scanning time that said level of Medium Activity exceeded a second threshold;
in step (e), selecting said optimum channel in accordance with said predetermined rule taking said channel interference parameter and said channel sharing parameter into account.

Moreover, the present invention relates to a communication system comprising an access point as described above.

Also, the present invention relates to a method of dynamically selecting an optimum channel by an access point for a wireless communication network, comprising a processor and memory storing data and instructions, comprising the following steps:
(a) selecting a channel from a plurality of possible channels;
(b) collecting data as to at least level of interference on said channel during a predetermined scanning time;
(c) storing a channel interference parameter indicative of a time period in said scanning time that said level of interference exceeded a first threshold value;
(d) repeating steps (b) and (c) for all other channels of said plurality of channels;
(e) selecting said optimum channel in accordance with a predetermined rule taking said channel interference parameter into account.

Moreover, the present invention relates to a method as described above, wherein the following steps are carried out:
additionally storing, in step (c), a channel sharing parameter indicative of a time period in said scanning time that said level of sharing exceeded a second threshold;
in step (e), selecting said optimum channel in accordance with said predetermined rule taking said channel interference parameter and said channel sharing parameter into account.

Furthermore, the present invention relates to a computer program product for dynamically selecting an optimum channel by an access point of a wireless communication network, comprising a processor and memory for storing data and instructions, said computer program product after being loaded providing said access point with the following functionality:
(a) selecting a channel from a plurality of possible channels;
(b) collecting data as to at least level of interference on said channel during a predetermined scanning time;
(c) storing a channel interference parameter indicative of a time period in said scanning time that said level of interference exceeded a first threshold value;
(d) repeating steps (b) and (c) for all other channels of said plurality of channels;
(e) selecting said optimum channel in accordance with a predetermined rule taking said channel interference parameter into account.

The present invention also relates to a data carrier provided with a computer program product as described above.

The present invention is based on passive listening and does not depend on correspondence from other APs, made by other manufacturers. So, it is better suited for the unlicensed band than systems known from the prior art. Moreover, an access point in the present invention, because of direct measurement, is evaluating the interference in a much more precise way than in the prior art where the interference was estimated. Furthermore, an access point in the present invention is able of determining the load of other APs without the need for sending load information by way of Probe Responses and Probe Requests. The present invention is based on altering the duration of passive listening, so an AP can adjust the total scanning period depending on the load. Besides this, access points in the present invention can, by listening on their operating channel and recording the interference on it, decide when to change channels.

BRIEF DESCRIPTION OF THE DRAWINGS

Below, the invention will be explained with reference to some drawings, which are intended for illustration purposes only and not to limit the scope of protection as defined in the accompanying claims.

FIG. 1 shows a wireless LAN with a first access point AP1 and two of its associated network stations NS1, NS2, a second access point AP2 and an interfering source IS.

FIG. 2 shows a block diagram of the arrangement of the present invention for a wireless LAN interface card.

DESCRIPTION OF PREFERRED EMBODIMENTS

Figure 3:
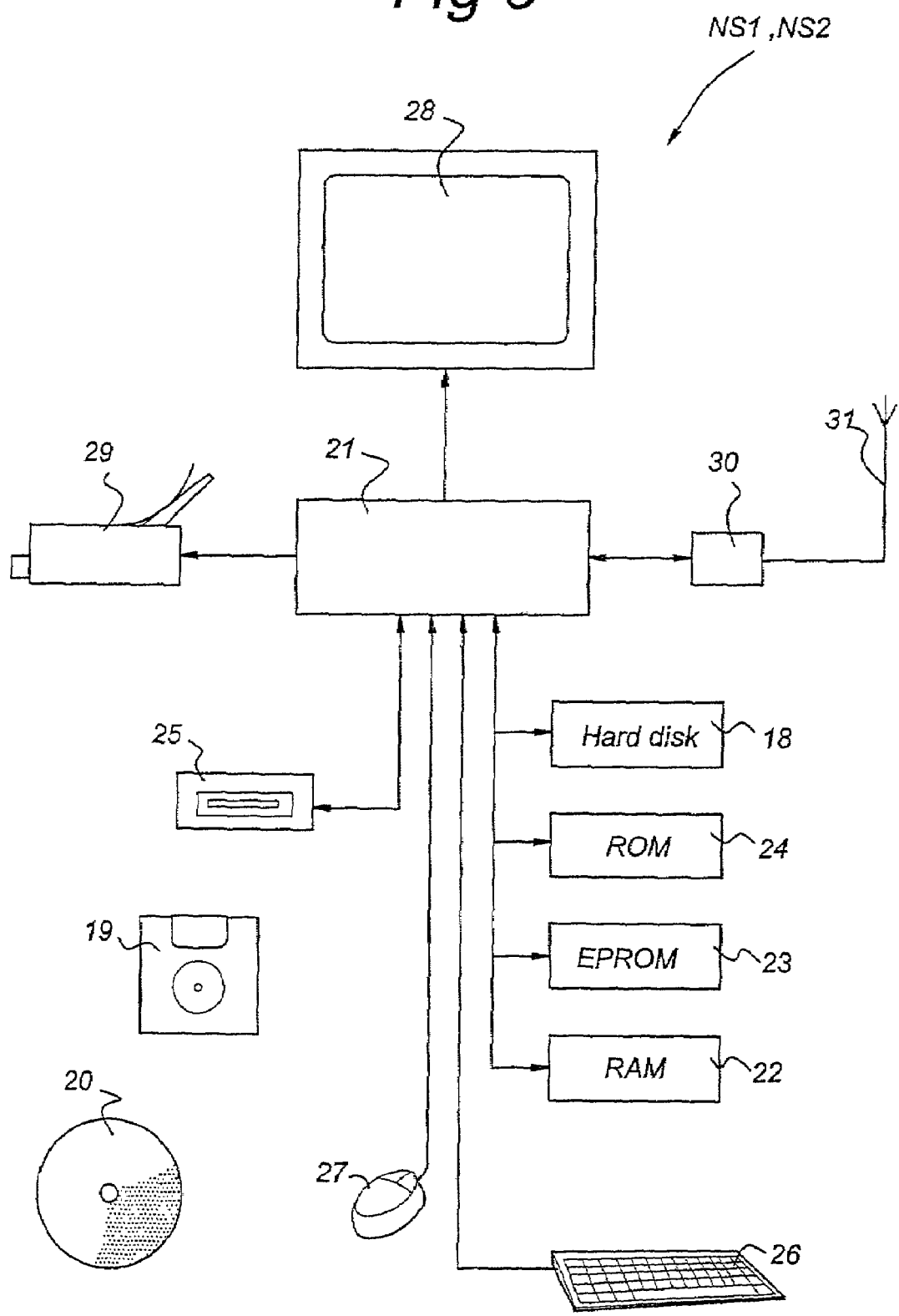
FIG. 3 shows a schematic block diagram of a network station.

In FIG. 1, a wireless LAN 1 and two of its access points AP1, AP2 with cells 2, 4 are shown. Also two network stations NS1, NS2 are shown. Access point AP1 is serving cell 2 and access point AP2 has its own cell 4. The boundaries of cell 2 are defined by the carrier detect threshold (CT) used by the network stations NS1, NS2 and the access point AP1. Outside the cell 2, the receive level of signals coming from AP1 will be lower than the CT, so network stations located outside cell 2 will not be able to communicate (be associated) with AP1. The area outside cell 2 is covered by other APs within the same wireless LAN or is not part of the wireless LAN at all. Both network stations NS1 and NS2 are operating on an operating channel C1 of access point AP1.

In FIG. 1, an interfering source IS is located in such a way that it will cause interference at the location of AP1. The source IS is transmitting on the same frequencies as AP1. The circle 6 depicts the positions in which the receive level of the signal coming from IS equals the carrier detect threshold of AP1. When the source IS becomes active, AP1 will decide to switch to another channel. Source IS can be, for example, a microwave oven or it may be another AP not capable of switching to an appropriate channel (DFS). Since the wireless LAN 1 operates in the 2.4 GHz ISM band, which is an unlicensed band, many unpredictable interference sources could interfere with the access point AP1 and its network stations NS1, NS2.

FIG. 2 shows an example of a block diagram of an arrangement of the present invention for a medium access controller (MAC) device 11 on a wireless LAN interface card 30 installed in network station NS1, NS2 or on a similar wireless LAN interface card 130 installed in access point AP1, AP2, respectively.

Here, the MAC device 11 is schematically depicted, showing only a signal-processing unit 12, a signal reception level detection circuit 13, an antenna 31 and an on-board memory 14 as needed for the description of this embodiment of the invention. The MAC device 11 may comprise other components not shown here. Also, the components 12, 13, 14 which are shown, may be separate devices or integrated into one device. As desired, the devices also may be implemented in the form of analog or digital circuits. The on-board memory 14 may comprise RAM, ROM, FlashROM and/or other types of memory devices, as are known in the art.

FIG. 3 shows a schematic block diagram of an embodiment of a network station NS1, NS2 comprising processor means 21 with peripherals. The processor means 21 is connected to memory units 18, 22, 23, 24 which store instructions and data, one or more reading units 25 (to read, e.g., floppy disks 19, CD ROM's 20, DVD's, etc.), a keyboard 26 and a mouse 27 as input devices, and as output devices, a monitor 28 and a printer 29. Other input devices, like a trackball and a touch screen, and output devices may be provided for. For data-communication over the wireless LAN 1, an interface card 30 is provided. The interface card 30 connects to an antenna 31.

The memory units shown comprise RAM 22, (E)EPROM 23, ROM 24 and hard disk 18. However, it should be understood that there may be provided more and/or other memory units known to persons skilled in the art. Moreover, one or more of them may be physically located remote from the processor means 21, if required. The processor means 21 are shown as one box, however, they may comprise several processing units functioning in parallel or controlled by one main processor, that may be located remote from one another, as is known to persons skilled in the art.

Figure 4:
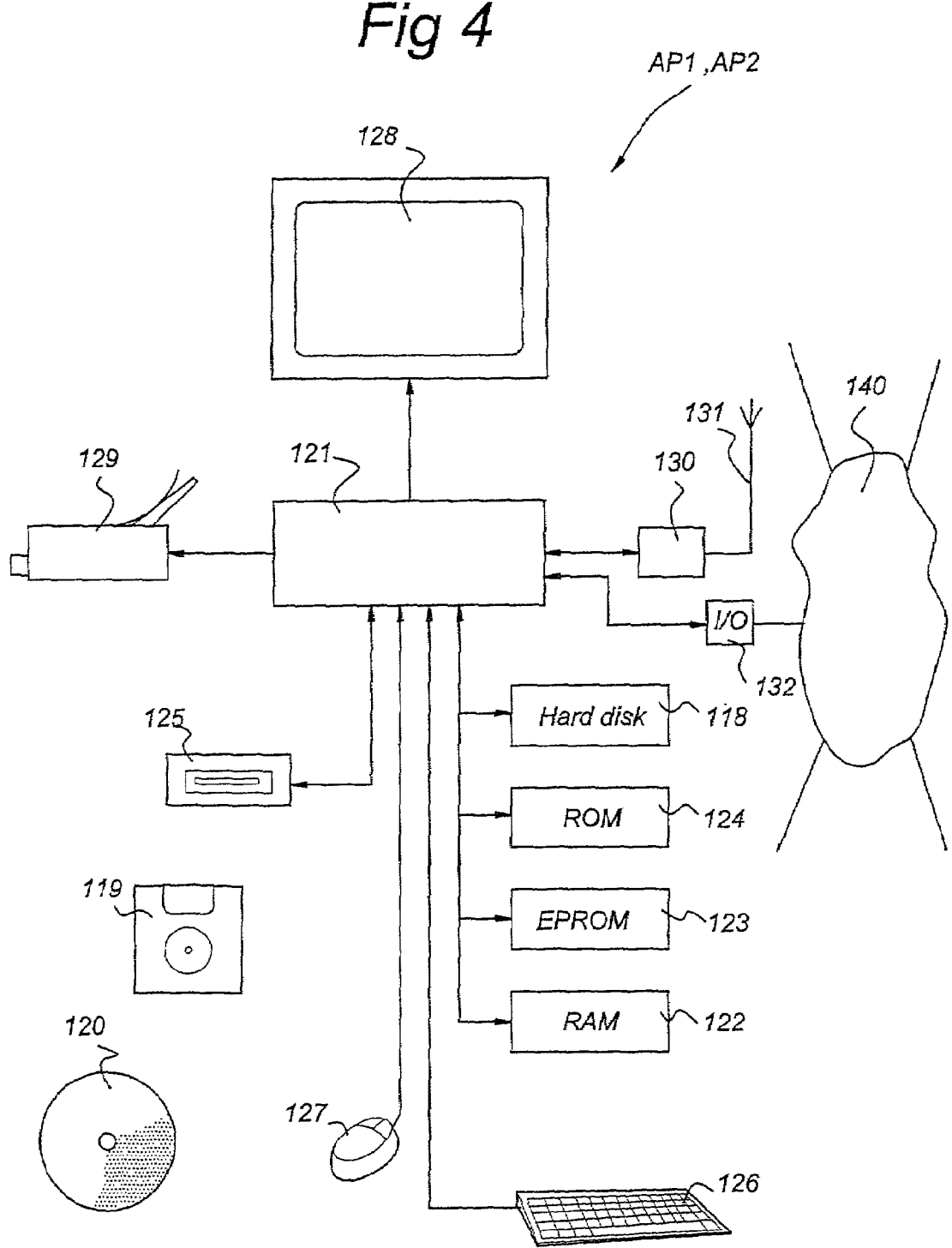
FIG. 4 shows a schematic block diagram of an AP.

In an alternative embodiment of the present invention, the network station NS1, NS2 may be a telecommunication device in which the components of interface card 30 are incorporated as known to those skilled in the art. FIG. 4 shows a schematic block diagram of an embodiment of access point AP1, AP2 comprising processor means 121 with peripherals. The processor means 121 is connected to memory units 118, 122, 123, 124 which store instructions and data, one or more reading units 125 (to read, e.g., floppy disks 119, CD ROM's 120, DVD's, etc.), a keyboard 126 and a mouse 127 as input devices, and as output devices, a monitor 128 and a printer 129. For data-communication over the wireless LAN 1, an interface card 130 is provided. The interface card 130 connects to an antenna 131. Furthermore, the access point AP1, AP2 is connected to a wired distribution network 140 through I/O means 132 for communication with other access points and/or other communication devices.

The memory units shown comprise RAM 122, (E)EPROM 123, ROM 124 and hard disk 118. However, it should be understood that there may be provided more and/or other memory units known to persons skilled in the art. Moreover, one or more of them may be physically located remote from the processor means 121, if required. The processor means 121 are shown as one box, however, they may comprise several processing units functioning in parallel or controlled by one main processor, that may be located remote from one another, as is known to persons skilled in the art. Moreover, other input/output devices than those shown (i.e. 126, 127, 128, 129) may be provided.

In an alternative embodiment of the present invention, the access point AP1, AP2 may be a telecommunication device in which the components of interface card 130 are incorporated as known to those skilled in the art. The activation of an interfering source IS shown in FIG. 1 will cause sudden interference to AP1 because it is using the same channel C1. Now, access point AP1 can choose to decide to change its channel in use and switch to another channel after a random time after the interference experienced by it exceeds a certain threshold. The choice of its new channel will be based on the statistical information collected and stored by it over time for all other channels. The most recent information will be given more weight than the old information. A random timer associated with the change of channel will avoid APs changing channels simultaneously.

Figure 5:
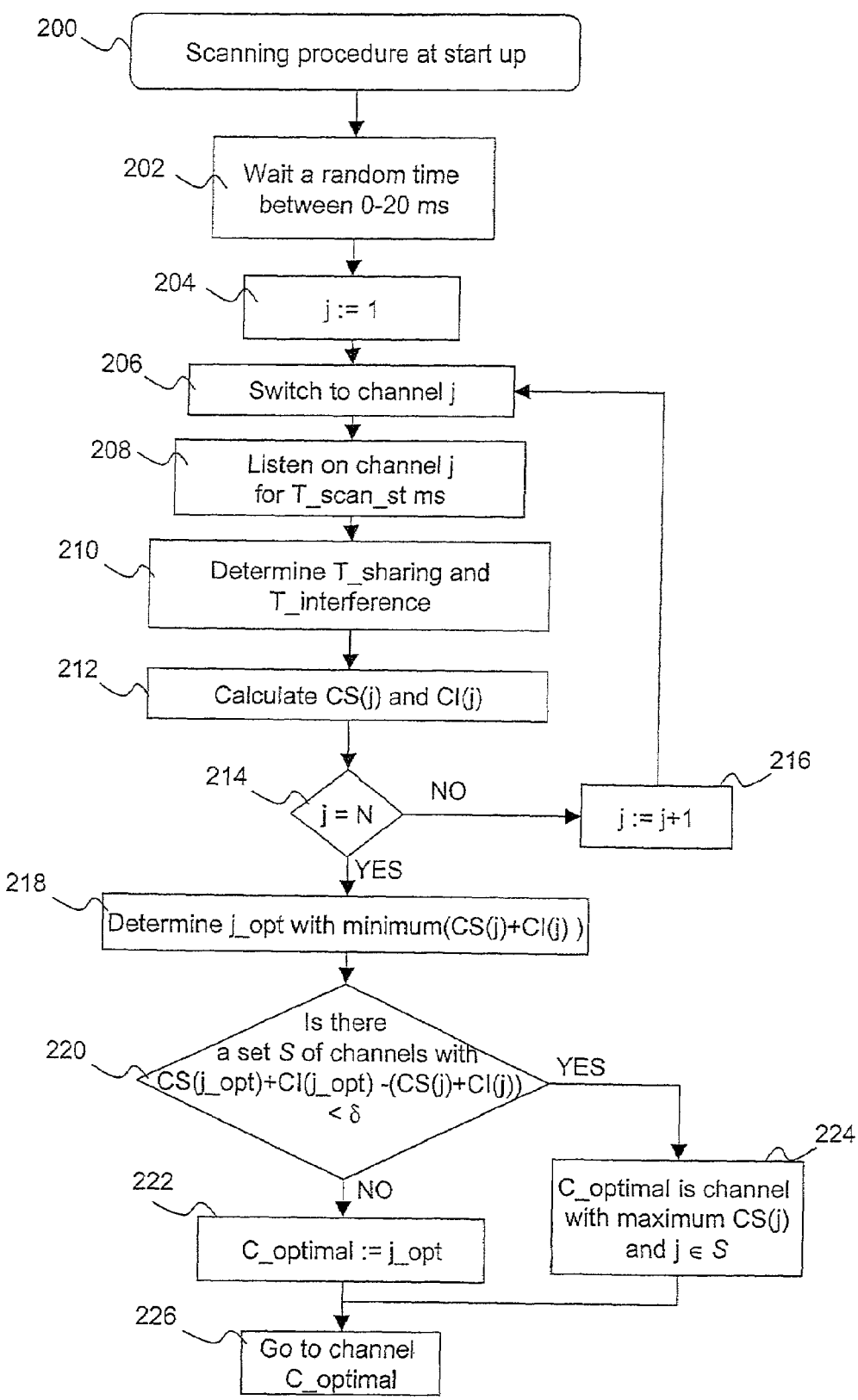
FIG. 5 shows a flow diagram of a channel scanning procedure executed at start up by an AP in the present invention.

FIG. 5 shows a flow diagram of a channel scanning procedure 200 executed by access point AP1 at start up in order to collect statistical information on all channels and choose the best channel available. At step 202, AP1 first waits a random time between 0 and 20 ms. At step 204, a channel variable j is set to 1. Now, at step 206, the access point AP1 will switch to channel j. It will listen on channel j for a period of T_scan_st ms at step 208. Listening on channel j means receiving signals from other sources sent on channel j. At step 210, variables T_sharing(j) and T_interferences(j) are determined. T_sharing(j) is the duration of Medium Activity noticed above a defer threshold R_defer on channel j. T_interferences(j) is the duration of Medium Activity noticed below the defer threshold R_defer and above the carrier threshold R_carrier on channel j. At step 212, the values of a channel sharing variable CS(j) and a channel interference variable CI(j) are calculated where CS(j)=T_sharing(j)/T_scan_st and CI(j)=T_interference(j)/T_scan_st. These values are stored in a table. It is assumed that the defer threshold is higher than the carrier detect threshold. However, under the situations that the carrier threshold is higher than the defer threshold, T_interference (j) is set to zero. In a preferred embodiment T_sharing(j) is the duration of Medium Activity noticed above a defer threshold R_defer on channel j and T_interference(j) is the duration of Medium Activity noticed below the defer threshold R_defer and above a threshold R_new on channel j, wherein R_new is below R_defer.

At step 214, it is checked if j equals N where N is the maximum channel number. Normally, N is larger than 1 so next step 216 will be executed. This means j will be increased by 1. Now steps 206–214 will be executed again. This loop will continue until j equals N. In that case, step 214 will result in a YES and step 218 will follow. In step 218, optimum channel j_opt is determined with CS(j_opt)+CI (j_opt) minimum(CS(j)+CI(j); j=1, . . . N). At step 220, it is checked if there are other channels that cause almost the same amount of sharing and interference. In other words, it is checked if there exist channels j with (CS(j_opt)+CI (j_opt))−(CS(j)+CI(j))<δ where δ has a predetermined, very small, value. If this is not the case then, at step 222, an optimal channel parameter C_ optimal will be set to j_opt. If the condition checked at step 220 is true then the channel j that meets the condition of step 220 and where the value CS(j) is the highest among the channels that meet the condition of step 220, will be used for C_optimal. See step 224. The final step is step 226 in which the AP will go to channel C_optimal to operate on.

Figure 6:
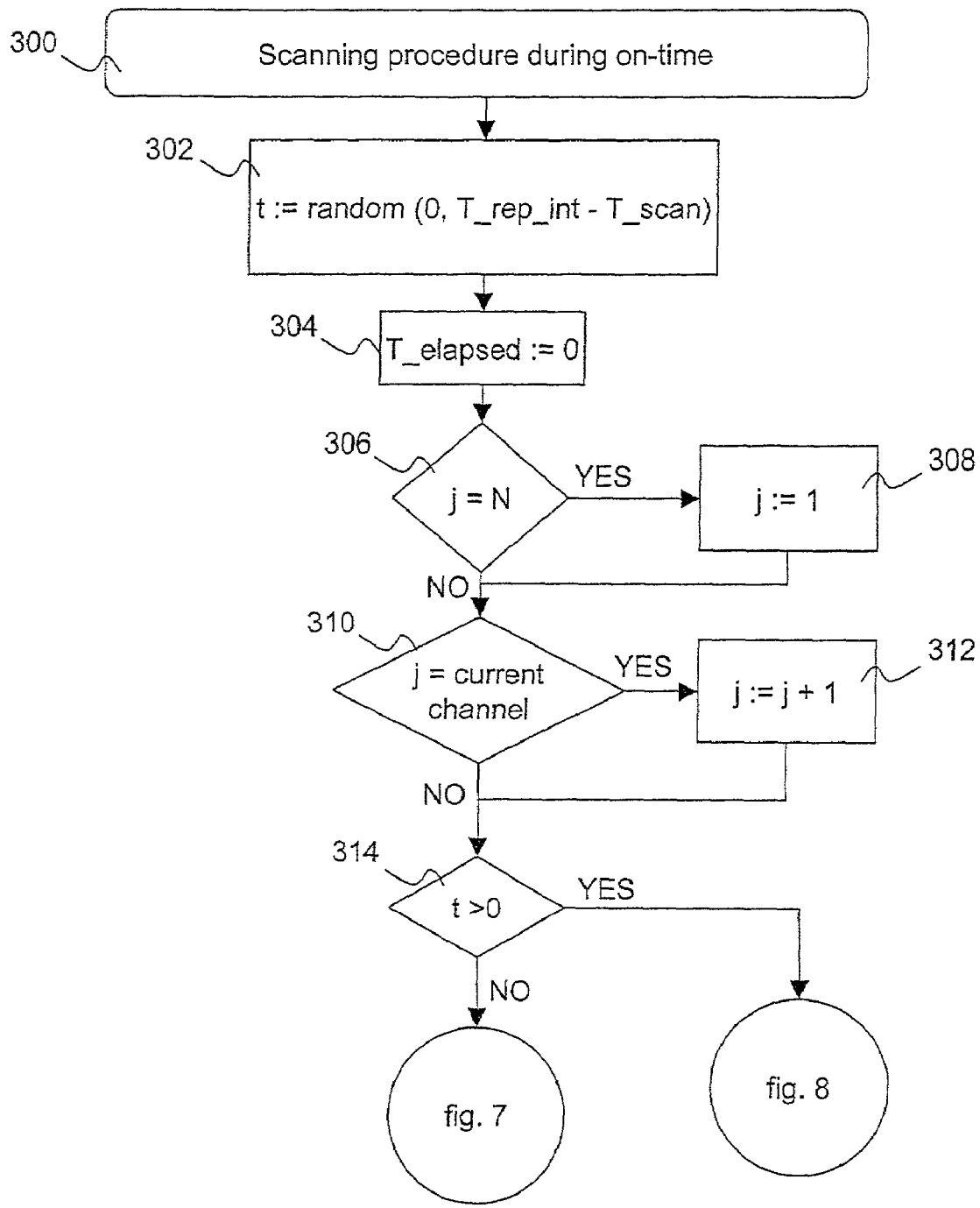
FIGS. 6, 7 and 8 show a flow diagram of the channel scanning procedure executed during on-time by an AP in the present invention.

FIG. 6 shows a flow diagram of a scanning procedure 300 of an AP during on-time. The procedure 300 starts with step 302 in which the variable t is calculated from a random value between 0 and T_rep_int-T_scan. The value T_rep_int represents a duration of a CFP repetition interval i.e. the time between two beacon frames. The value T_scan represents the time spent on passively listening on a specific channel.

At step 304, a variable T_elapsed, indicating time elapsed since start of this procedure, is set to zero. At step 306, it is tested if the channel variable j is equal to the maximum channel number N. If this is the case, step 308 is executed and j is set to 1. If j is less than N step 310 follows directly. At step 310, it is checked if j is the current channel. If this is the case step 312 is executed and j is increased by 1. If j is not the current channel step 314 follows directly. In step 314, it is checked if t is larger than zero. If this is true then the procedure shown in FIG. 8 will follow. If t is equal to zero, the procedure from FIG. 7 will follow.

Figure 7:
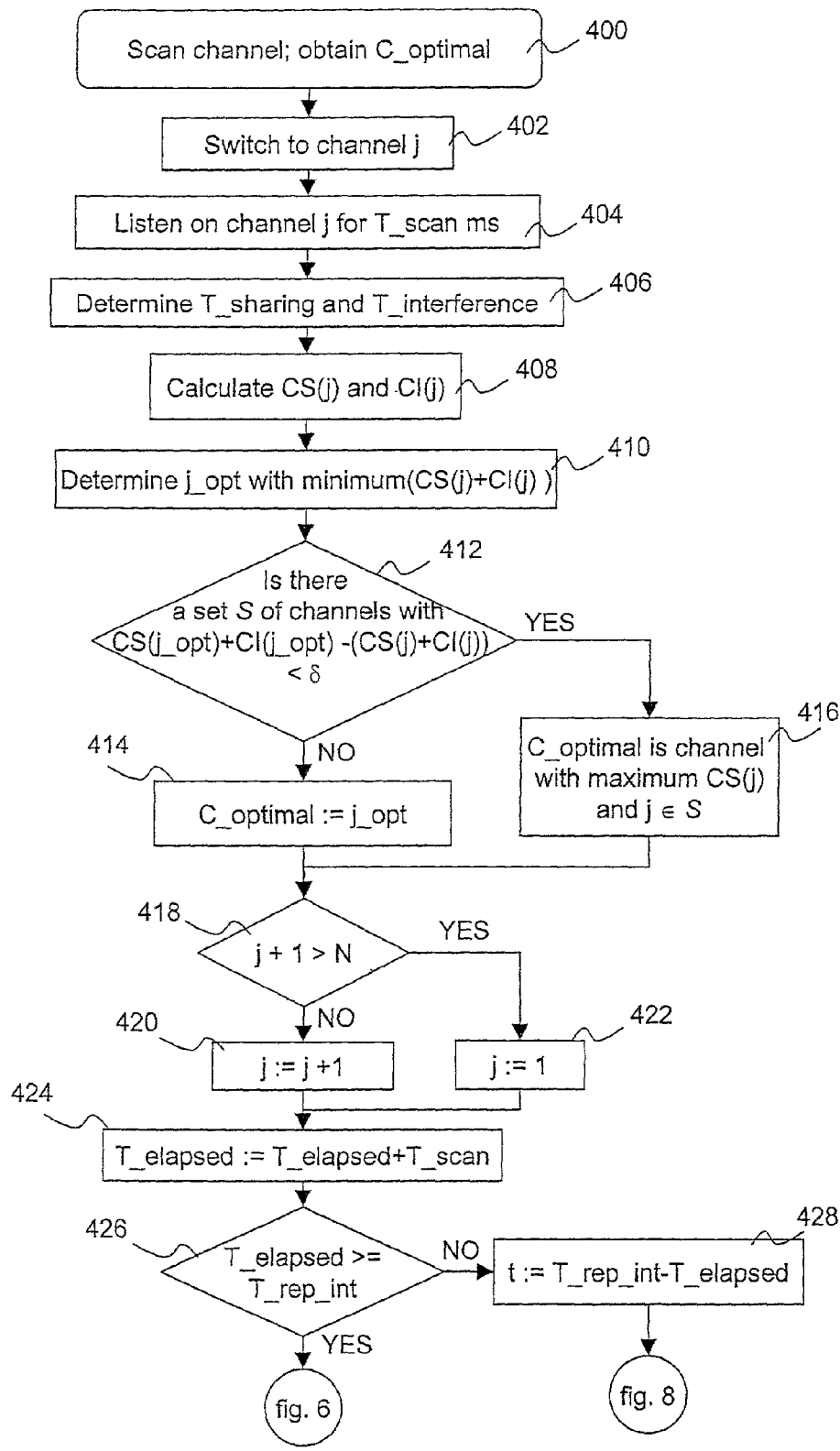

In FIG. 7, a procedure 400 for obtaining a new C_optimal is shown. The procedure 400 starts with step 402 in which the AP switches to channel j. Then, at step 404, the AP is listening on channel j for T_scan ms. At step 406, values of T_sharing(j) and T_interference(j) are determined. T_sharing(j) is the duration of Medium Activity noticed above the defer threshold R_defer on channel j. T_interference(j) is the duration of Medium Activity noticed below the defer threshold R_defer and above the carrier threshold R_carrier on channel j. Now, at step 408, the values of CS(j) and CI(j) are calculated with the following formulas:

$$CS(j) := \frac{CS(j) + w \times \frac{T\_sharing(j)}{T\_scan}}{w + 1}$$

$$CI(j) := \frac{CI(j) + w \times \frac{T\_Interference(j)}{T\_scan}}{w + 1}$$

In these formulas w is a weighting factor (w>1) that causes new (measured) channel sharing and interference to be more important than older values of CS(j) and CI(j).

At step 410 in FIG. 7, the possible optimal channel j_opt is determined. This is the channel where CS(j)+CI(j) is the smallest. At step 412, it is checked if there exist one or more other channels (forming a set S) that have almost as little values for CS(j)+CI(j) as the channel j_opt. If this is not the case then step 414 follows and the optimal channel C_optimal is set to j_opt. However, if the condition checked at step 412 is met then step 416 follows. This means that the channel in set S with the highest CS(j) is used for the optimal channel C_optimal. In this way sharing is given priority over interference. At step 418, the channel number is checked. If j+1 is larger than N, then step 422 follows and j is set to 1. If j+1 is not larger than N step 420 follows and j is increased by 1. Now, at step 424, the value of T_elapsed is increased by T_scan. At step 426, it is checked if T_elapsed is equal or larger than T_rep_int, where T_rep_int is the time between two beacons. If this is true then the procedure shown in FIG. 6 follows. If the result of the test at step 426 is not true then the variable t is set to T_rep_int-T_elapsed in step 428 and after that the procedure shown in FIG. 8 follows.

Figure 8:
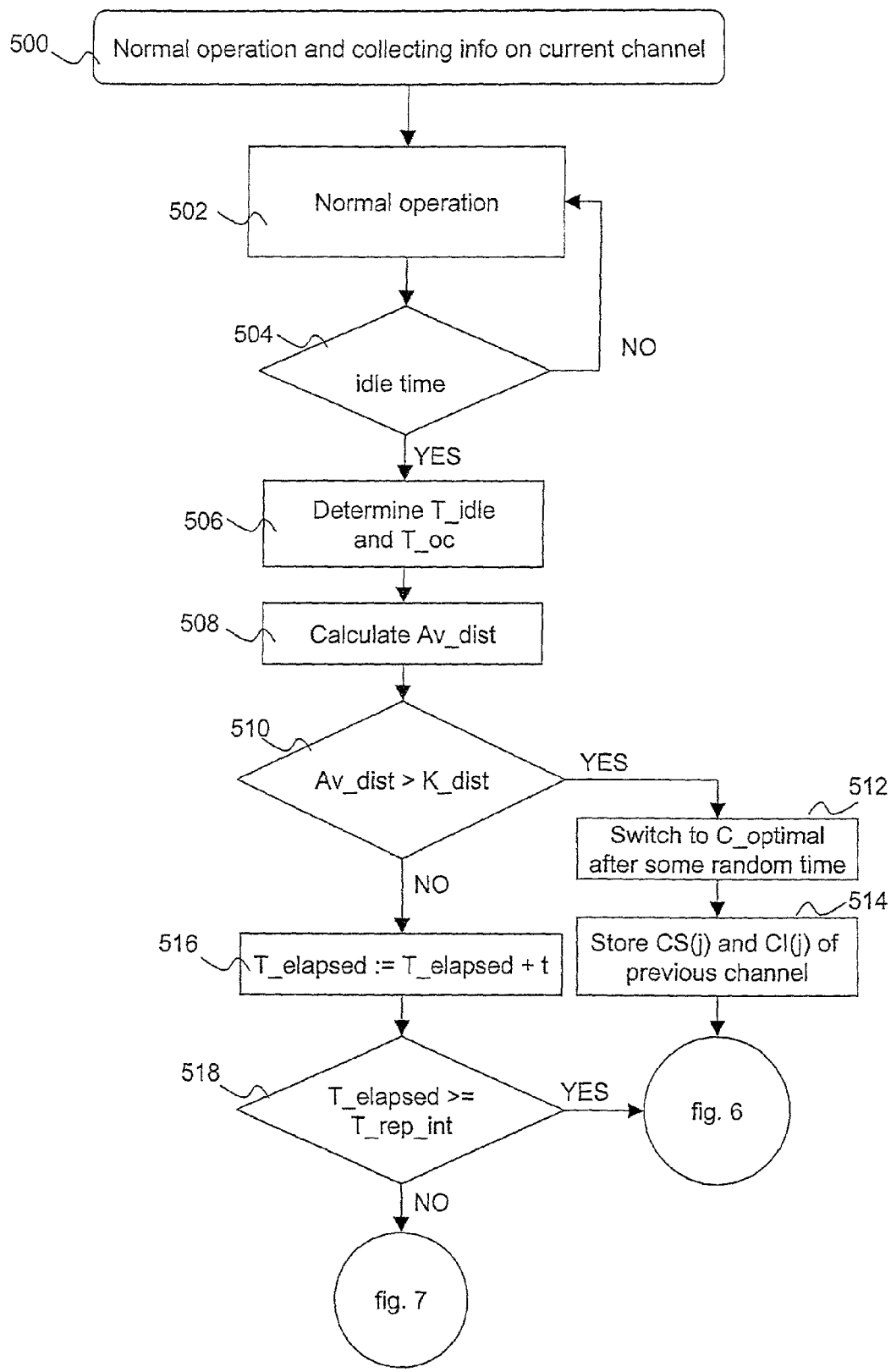

In FIG. 8, a procedure 500 for the normal operation of the AP and the collecting of info on the channel in use, is shown. The procedure starts with the normal operation in step 502. At step 504, it is checked if the AP is idle or not. If the AP is not idle the normal procedure continues. If the AP is idle then T_idle and T_oc are determined where T_idle is the duration of the idle time of the AP and T_oc is the duration of Medium Activity observed on current channel. This Medium Activity can be monitoring received packets not meant for the AP and monitoring activity above a certain threshold. At step 508, a value for average disturbance Av_dist is calculated. The following formula is used:

$$Av\_dist := \frac{Av\_dist + w \times \frac{T\_oc}{T\_idle}}{w+1}$$

In the formula, w is a weighting factor (w>1) that causes a new (measured) disturbance to be more important than older values of Av_dist. Initially, during start-up of the access point, the value for Av_dist is set to zero.

At step 510, Av_dist is compared with K_dist. K_dist is the threshold for allowable disturbance on the current operating channel. If Av_dist is above threshold K_dist then step 512 follows. This means that the AP switches its channel to C_optimal immediately or after some random time. Then step 514 follows. In this step the data collected on the previously used channel is stored in the table. Next the procedure shown in FIG. 6 will follow. If at step 510 the value of Av_dist is not above the threshold K_dist, then step 516 will follow. At step 516, T_elapsed is increased by t. Then, at step 518, the elapsed time T_elapsed is compared to T_rep_int. If T_elapsed is equal or higher than T_rep_int the procedure shown in FIG. 6 is executed. If T_elapsed is lower than T_rep_int, the procedure shown in FIG. 7 will follow.

At step 208 (FIG. 5), the AP listens on channel j for T_scan ms. The value of T_scan can be made dependent on the load of the AP. In this way the AP will be able to spend more time on scanning (=listening on) other channels when its load is low and vice versa. The TX/RX activity (TX/RX=transmit/receive) can give the percentage load for the AP. It is maintained over 10 sec. It is a known fact that for non-persistent CSMA delays are greatly dependent on the load, see Joao L. Sobrinho, A. S. Krishnakumar, "Real-time traffic over IEEE 802.11 MAC layer", Bell Labs Technical Journal, Autumn 1996, and Kwang-Cheng Chen, "MAC for wireless LANs for Mobile computing", IEEE Network Magazine, Vol. 8, No. 5, September/October 1994. The delay increases beyond bounds if the load increases beyond for e.g. 60%. So the fraction of time available for scanning is (0.6-TR) sec. every second, where TR=minimum(0.55, (value of TX/RX activity in %)/100). If the length of the duration interval T_rep_int is 100 ms then the fraction of time available for scanning is (6-TR*10)*10 ms. So in each repetition interval (6-TR*10) ms can be spent on scanning other channels. If this value is too small then only one channel should be scanned in one repetition interval. Also the frequency could be reduced. For instance, each channel could be scanned for 2*(6-TR*10) ms once every two repetition intervals. A sequence should be maintained for scanning the different channels.

The algorithm described above uses two thresholds to distinguish between sharing and interference. Because present hardware might not be capable of using two thresholds, it is suggested to use only one threshold called the EDT (energy detect threshold). The AP can only monitor and detect something above this threshold. This EDT is used to detect interference by setting it to a value above which any received signal would cause interference in the worst case. In this way, an optimum channel is selected only on the basis of at least interference. Now, the optimal channel will be found as follows: C_optimal=channel with minimum(T_interference(j)/T_scan) where T_interference is the time during which the interference activity is above EDT. A typical value for EDT is the average of the values for the carrier detect threshold and the defer threshold.

The channel change notification for network stations as mentioned in [Kamerman, 1999] can also be used for an alternative passive listening algorithm. For example, if an AP is changing its channel for scanning purposes, it can instruct its network stations to follow. Now, the AP can stay on this channel for normal operation and for listening. In this way, the AP can stay on that channel for a period of one repetition interval (100 ms) or more. Having collected enough information it can move on to another channel. But the AP can also stay on the channel if it is good enough. Or it can continue to scan and choose the best channel for long term operation. This kind of a scanning procedure will be initiated every time the disturbances experienced by the AP on its current channel exceed a certain threshold.

The invention claimed is:

1. An access point for a wireless communication network, comprising a processor and memory storing data and instructions, arranged to dynamically select an optimum channel by carrying out the following steps:
   (a) selecting a channel from a plurality of possible channels;
   (b) collecting data as to at least level of Medium Activity on said channel during a predetermined scanning time;
   (c) storing a channel interference parameter indicative of a time period in said scanning time that said level of Medium Activity exceeded a first threshold value;
   (d) repeating steps (b) and (c) for all other channels of said plurality of channels;
   (e) selecting said optimum channel in accordance with a predetermined rule taking said channel interference parameter into account,
and wherein said channel interference parameter, at system startup, is defined as CI(j)=T_interference(j)/T_scan(j) with T_scan(j) being said scanning time on said channel (j) and T_interference(j) being a time period in said scanning time that said level of activity exceeded said first threshold.

2. Access point according to claim 1, wherein the following steps are carried out:
   additionally storing, in step (c), a channel sharing parameter indicative of a time period in said scanning time that said level of Medium Activity exceeded a second threshold;
   in step (e), selecting said optimum channel in accordance with said predetermined rule taking said channel interference parameter and said channel sharing parameter into account.

3. Access point according to claim 2, wherein said channel sharing parameter, at system startup, is defined as CS(j)=T_sharing(j)/T_scan(j) with T_scan(j) being said scanning time on said channel (j) and T_sharing(j) being a time period in said scanning time that said level of Medium Activity exceeded said second threshold.

4. Access point according to claim 2, wherein the channel interference parameter and the channel sharing parameter are added together to form a sum for each of said channels, and said optimum channel is determined as being the channel for which said sum is a minimum.

5. Access point according to claim 2, wherein said optimum channel is determined as being part of a set of channels having sums of said channel interference parameter and said channel sharing parameter, wherein said sums are within a predefined distance δ from the minimum sum, and wherein said optimum channel has the largest channel sharing parameter of the channels in said set.

6. Access point according to claim 2, wherein said channel sharing parameter, during on-time, is defined as CS(j) with:

$$CS(j) := \frac{CS(j) + w \times \frac{T\_sharing(j)}{T\_scan}}{w+1}$$

with T_scan(j) being said scanning time on said channel (j) and T_sharing(j) being a time period in said scanning time that said level of Medium Activity exceeded said second threshold and where w is a weighting factor (w>1) that causes new channel sharing to be more important than older values of CS(j).

7. Access point according to claim 1, wherein said channel interference parameter, during on-time, is defined as CI(j) with:

$$CI(j) := \frac{CI(j) + w \times \frac{T\_Interference(j)}{T\_scan}}{w+1}$$

with T_scan(j) being said scanning time on said channel (j) and T_interference(j) being a time period in said scanning time that said level of Medium Activity exceeded said first threshold and where w is a weighting factor (w>1) that causes new channel interference to be more important than older values of CI(j).

8. Access point according to claim 1, wherein said access point monitors its current channel during normal operation, in order to calculate an average disturbance AV_dist, wherein said access point switches to said optimum channel if said calculated average disturbance exceeds a disturbance threshold K_dist for allowable disturbance, wherein:

$$Av\_dist := \frac{Av\_dist + w \times \frac{T\_oc}{T\_idle}}{w+1}$$

with T_idle being a duration of idle time and T_oc being a duration of time in which Medium Activity, not meant for said access point, is observed, and where w is a weighting factor (w>1) that causes a new average disturbance to be more important than older values of Av_dist.

9. Access point according to claim 1, wherein said access point is arranged to determine its load and to use a said predetermined scanning time that is longer when the load becomes lower and vice versa.

10. Communication system comprising an access point, said access point comprising a processor and memory storing data and instructions, arranged to dynamically select an optimum channel by carrying out the following steps:
   (a) selecting a channel from a plurality of possible channels;
   (b) collecting data as to at least level of Medium Activity on said channel during a predetermined scanning time;
   (c) storing a channel interference parameter indicative of a time period in said scanning time that said level of Medium Activity exceeded a first threshold value;
   (d) repeating steps (b) and (c) for all other channels of said plurality of channels;
   (e) selecting said optimum channel in accordance with a predetermined rule taking said channel interference parameter into account,
and wherein said channel interference parameter, at system startup, is defined as CI(j)=T_interference(j)/T_scan(j) with T_scan(j) being said scanning time on said channel (j) and T_interference(j) being a time period in said scanning time that said level of activity exceeded said first threshold.

11. Method of dynamically selecting an optimum channel by an access point for a wireless communication network, comprising a processor and memory storing data and instructions, comprising the following steps:
   (a) selecting a channel from a plurality of possible channels;
   (b) collecting data as to at least level of interference on said channel during a predetermined scanning time;
   (c) storing a channel interference parameter indicative of a time period in said scanning time that said level of interference exceeded a first threshold value;
   (d) repeating steps (b) and (c) for all other channels of said plurality of channels;
   (e) selecting said optimum channel in accordance with a predetermined rule taking said channel interference parameter into account, and wherein said channel interference parameter, at system startup, is defined as CI(j)=T_interference(j)/T_scan(j) with T_scan(j) being said scanning time on said channel (j) and T_interference(j) being a time period in said scanning time that said level of activity exceeded said first threshold.

12. Method according to claim 11, wherein the following steps are carried out:
   additionally storing, in step (c), a channel sharing parameter indicative of a time period in said scanning time that said level of sharing exceeded a second threshold;
   in step (e), selecting said optimum channel in accordance with said predetermined rule taking said channel interference parameter and said channel sharing parameter into account.

13. A computer readable medium tangibly embodying a program of instructions executable by a digital processor of a wireless communication network access point comprising said processor and a memory for storing data and instructions, said program after being loaded being executable to perform a method for dynamically selecting an optimum channel, said method comprising:
   (a) selecting a channel from a plurality of possible channels;
   (b) collecting data as to at least level of interference on said channel during a predetermined scanning time;
   (c) storing a channel interference parameter indicative of a time period in said scanning time that said level of interference exceeded a first threshold value;
   (d) repeating steps (b) and (c) for all other channels of said plurality of channels;
   (e) selecting said optimum channel in accordance with a predetermined rule taking said channel interference parameter into account, and wherein said channel interference parameter, at system startup, is defined as CI(j)=T_interference(j)/T_scan(j) with T_scan(j) being said scanning time on said channel (j) and T_interference(j) being a time period in said scanning time that said level of activity exceeded said first threshold.

14. An access point for a wireless communication network, comprising a processor and memory storing data and instructions, arranged to dynamically select an optimum channel by carrying out the following steps:
   (a) selecting a channel from a plurality of possible channels;
   (b) collecting data as to at least level of Medium Activity on said channel during a predetermined scanning time;

(c) storing a channel interference parameter indicative of a time period in said scanning time that said level of Medium Activity exceeded a first threshold value;

(d) repeating steps (b) and (c) for all other channels of said plurality of channels;

(e) selecting said optimum channel in accordance with a predetermined rule taking said channel interference parameter into account, and wherein said channel interference parameter, during on-time, is defined as CI(j) with:

$$CI(j) := \frac{CI(j) + w \times \frac{T\_Interference(j)}{T\_scan}}{w+1}$$

with T_scan(j) being said scanning time on said channel (j) and T_interference(j) being a time period in said scanning time that said level of Medium Activity exceeded said first threshold and where w is a weighting factor (w>1) that causes new channel interference to be more important than older values of CI(j).

15. Access point according to claim 14, wherein the following steps are carried out:
additionally storing, in step (c), a channel sharing parameter indicative of a time period in said scanning time that said level of Medium Activity exceeded a second threshold;
in step (e), selecting said optimum channel in accordance with said predetermined rule taking said channel interference parameter and said channel sharing parameter into account.

16. Access point according to claim 15, wherein said channel sharing parameter, at system startup, is defined as CS(j)=T_sharing(j)/T_scan(j) with T_scan(j) being said scanning time on said channel (j) and T_sharing(j) being a time period in said scanning time that said level of Medium Activity exceeded said second threshold.

17. Access point according to claim 15, wherein the channel interference parameter and the channel sharing parameter are added together to form a sum for each of said channels, and said optimum channel is determined as being the channel for which said sum is a minimum.

18. Access point according to claim 15, wherein said optimum channel is determined as being part of a set of channels having sums of said channel interference parameter and said channel sharing parameter, wherein said sums are within a predefined distance δ from the minimum sum, and wherein said optimum channel has the largest channel sharing parameter of the channels in said set.

19. Access point according to claim 15, wherein said channel sharing parameter, during on-time, is defined as CS(j) with:

$$CS(j) := \frac{CS(j) + w \times \frac{T\_sharing(j)}{T\_scan}}{w+1}$$

with T_scan(j) being said scanning time on said channel (j) and T_sharing(j) being a time period in said scanning time that said level of Medium Activity exceeded said second threshold and where w is a weighting factor (w>1) that causes new channel sharing to be more important than older values of CS(j).

20. Access point according to claim 14, wherein said access point monitors its current channel during normal operation, in order to calculate an average disturbance AV_dist, wherein said access point switches to said optimum channel if said calculated average disturbance exceeds a disturbance threshold K_dist for allowable disturbance, wherein:

$$Av\_dist := \frac{Av\_dist + w \times \frac{T\_oc}{T\_idle}}{w+1}$$

with T_idle being a duration of idle time and T_oc being a duration of time in which Medium Activity, not meant for said access point, is observed, and where w is a weighting factor (w>1) that causes a new average disturbance to be more important than older values of Av_dist.

21. Access point according to claim 14 herein said access point is arranged to determine its load and to use a said predetermined scanning time that is longer when the load becomes lower and vice versa.

22. Method of dynamically selecting an optimum channel by an access point for a wireless communication network, comprising a processor and memory storing data and instructions, comprising the following steps:
(a) selecting a channel from a plurality of possible channels;
(b) collecting data as to at least level of interference on said channel during a predetermined scanning time;
(c) storing a channel interference parameter indicative of a time period in said scanning time that said level of interference exceeded a first threshold value;
(d) repeating steps (b) and (c) for all other channels of said plurality of channels;
(e) selecting said optimum channel in accordance with a predetermined rule taking said channel interference parameter into account, and wherein said channel interference parameter, during on-time, is defined as CI(j) with:

$$CI(j) := \frac{CI(j) + w \times \frac{T\_Interference(j)}{T\_scan}}{w+1}$$

with T_scan(j) being said scanning time on said channel (j) and T_interference(j) being a time period in said scanning time that said level of Medium Activity exceeded said first threshold and where w is a weighting factor (w>1) that causes new channel interference to be more important than older values of CI(j).

23. Method according to claim 22, wherein the following steps are carried out:
additionally storing, in step (c), a channel sharing parameter indicative of a time period in said scanning time that said level of sharing exceeded a second threshold;
in step (e), selecting said optimum channel in accordance with said predetermined rule taking said channel interference parameter and said channel sharing parameter into account.

* * * * *